(12) United States Patent
Merrill

(10) Patent No.: US 9,928,033 B2
(45) Date of Patent: Mar. 27, 2018

(54) SINGLE-PASS PARALLEL PREFIX SCAN WITH DYNAMIC LOOK BACK

(71) Applicant: NVIDIA CORPORATION, Santa Clara, CA (US)

(72) Inventor: Duane Merrill, Charlottesville, VA (US)

(73) Assignee: NVIDIA Corporation, Santa Clara, CA (US)

( * ) Notice: Subject to any disclaimer, the term of this patent is extended or adjusted under 35 U.S.C. 154(b) by 430 days.

(21) Appl. No.: 14/043,626

(22) Filed: Oct. 1, 2013

(65) Prior Publication Data
US 2014/0380317 A1 Dec. 25, 2014

Related U.S. Application Data

(60) Provisional application No. 61/837,088, filed on Jun. 19, 2013.

(51) Int. Cl.
  *G06F 9/44* (2006.01)
  *G06F 9/45* (2006.01)
  *G06F 7/506* (2006.01)

(52) U.S. Cl.
  CPC .............. *G06F 7/506* (2013.01); *G06F 8/456* (2013.01); *G06F 2207/5063* (2013.01)

(58) Field of Classification Search
  None
  See application file for complete search history.

(56) References Cited

PUBLICATIONS

Deitz et. al., Global-view abstractions for user-defined reductions and scans, Mar. 2006, ACM, In Proceedings of the eleventh ACM SIGPLAN symposium on Principles and practice of parallel programming, pp. 1-7.*
Sengupta et al., Efficient Parallel Scan Algorithms for GPUs, Dec. 2008, NVIDIA, NVIDIA Technical Report NVR-2008-003, pp. 1-17.*

* cited by examiner

*Primary Examiner* — Lewis A Bullock, Jr.
*Assistant Examiner* — Melissa Headly
(74) *Attorney, Agent, or Firm* — Artegis Law Group, LLP

(57) ABSTRACT

One embodiment of the present invention performs a parallel prefix scan in a single pass that incorporates variable look-back. A parallel processing unit (PPU) subdivides a list of inputs into sequentially-ordered segments and assigns each segment to a streaming multiprocessor (SM) included in the PPU. Notably, the SMs may operate in parallel. Each SM executes write operations on a segment descriptor that includes the status, aggregate, and inclusive-prefix associated with the assigned segment. Further, each SM may execute read operations on segment descriptors associated with other segments. In operation, each SM may perform reduction operations to determine a segment-wide aggregate, may perform look-back operations across multiple preceding segments to determine an exclusive-prefix, and may perform a scan seeded with the exclusive prefix to generate output data. Advantageously, the PPU performs one read operation per input, thereby reducing the time required to execute the prefix scan relative to prior-art parallel implementations.

26 Claims, 7 Drawing Sheets

500
Segment Descriptors

| Segment ID 552 | Status Flag 554 | Aggregate 435 | Inclusive Prefix 445 |
|---|---|---|---|
| 0 | P | 2 | 2 |
| 1 | A | 2 | 4 |
| 2 | A | 2 | — |
| 3 | P | 2 | 8 |
| 4 | A | 2 | — |
| 5 | P | 2 | 12 |
| 6 | X | — | — |
| 7 | A | 2 | — |

FIG. 5

SINGLE-PASS PARALLEL PREFIX SCAN WITH DYNAMIC LOOK BACK

CROSS-REFERENCE TO RELATED APPLICATIONS

This application claims the priority benefit of the U.S. Provisional Patent Application Ser. No. 61/837,088, filed on Jun. 19, 2013. The subject matter of this related application is hereby incorporated herein by reference.

GOVERNMENT RIGHTS IN THIS INVENTION

This invention was made with U.S. government support under LLNS subcontract B599861 awarded by DOE, and with government support under agreement No. HR0011-13-3-0001 awarded by DARPA. The U.S. government has certain rights in this invention.

BACKGROUND OF THE INVENTION

Field of the Invention

Embodiments of the present invention relate generally to computer science and, more specifically, to a single-pass parallel prefix scan with dynamic look-back.

Description of the Related Art

Prefix scan is a well-known computation primitive used in a wide variety of areas. Some notable applications of prefix scan include adders, recurrence solvers, cooperative allocation, compaction, run-length encoding, and duplicate removal. In operation, given a list of input elements and a binary reduction operator, a prefix scan produces a corresponding output list where each output is the reduction of the elements occurring earlier in the input list. An inclusive scan indicates that the $n^{th}$ output reduction incorporates the $n^{th}$ input element. Similarly, an exclusive scan indicates the $n^{th}$ output reduction does not incorporate the $n^{th}$ input element. For instance, a "prefix sum" is a prefix scan in which the binary reduction operator is an addition operation. Consequently, in a prefix sum, each output number is the sum of the corresponding numbers occurring previously in the input list. Thus, for an input list of [8, 6, 7, 5, 3, 0, 9], the inclusive prefix sum is [8, 14, 21, 26, 29, 29, 38] and the exclusive prefix sum is [0, 8, 14, 21, 26, 29, 29].

In many computer systems, the overall time required to execute a prefix scan is bounded by the time required to execute the memory access operations. Consequently, decreasing the number of memory access operations has the desirable effect of increasing performance and decreasing power consumption.

To scan "n" input elements, the theoretical minimum number of memory accesses is 2*n. Each of the n inputs must be read from memory and each of the n outputs must be written to memory. This lower bound is achieved by the typical sequential implementation of prefix scan, which requires only a single pass through the data. A processor iterates over the input list while accumulating a running aggregate. Before each input is accumulated, the processor assigns the current value of the running aggregate to the corresponding exclusive scan output. The processor performs n−1 reduction operations, n input data read operations, and n output data write operations.

For multi-processor systems, a parallel implementation allows the system to utilize more than one processing element when computing a prefix scan. One common parallel implementation of prefix scan is the "reduce-then-scan" approach. Although this method requires two global passes through the data, it achieves high processor and memory bandwidth utilization. A multi-processor system partitions the input data into segments and assigns each segment to a processor included in the multi-processor system. In the reduction pass, processors operate in parallel where each processor computes a reduction of the associated segment. Subsequently, the multi-processor system computes an exclusive prefix scan of the (much-smaller) list of per-segment aggregates. The result is a corresponding list of per-segment prefixes. In the scan pass, processors again operate in parallel where each processor computes a prefix scan across the associated segment, seeded with the appropriate exclusive prefix. The reduce-then-scan implementation performs approximately 2*n reduction operations (n−1 per pass), approximately 2*n data read operations (n per pass), and approximately n output data write operations. Thus the number of memory access operations is approximately 3*n, a 1.5× increase versus the theoretical minimum.

Prior efforts at constructing single-pass parallel implementations of prefix scan having approximately the same 2*n memory workload as the theoretical minimum have suffered from processor and memory bandwidth underutilization. These "chained-scan" methods operate by partitioning the input data into segments which are assigned to parallel processors in which each processor reads its associated segment from global memory into its own local memory. Processors proceed in parallel during a local reduction pass in which each processor computes a per-segment aggregate. Each processor then waits on the processor assigned to the preceding segment to communicate a running prefix aggregate. Once the running prefix is made available, that processor then combines the prefix with its per-segment aggregate and then communicates the updated running prefix to the next processor. Processors that have received their per-segment exclusive prefix are then able to proceed in parallel during a local scan pass in which each processor performs a scan across its local segment, seeded with the exclusive segment prefix. The results are then written out to global memory. The serial dependences between processors cause chained waiting, which prevents high overall system utilization. The performance of the overall computation is thus limited by the latency of inter-processor signaling instead of aggregate memory system bandwidth.

Accordingly, what is needed in the art is a more effective approach to performing a parallel prefix scan

SUMMARY OF THE INVENTION

One embodiment of the present invention sets forth a method for performing a prefix scan. The method includes subdividing a list of input data into a plurality of segments, where a second segment precedes a first segment, and a third segment precedes the second segment. The method also includes calculating a first aggregate that represents an accumulation of one or more reduction operations performed on the first segment; calculating a second aggregate that represents an accumulation of one or more reduction operations performed on the second segment; and calculating a third aggregate that represents an accumulation of one or more reduction operations performed on the third segment. The method further includes calculating a first exclusive prefix based on the second aggregate and the third aggregate; calculating a first inclusive prefix based on the first exclusive prefix and the first aggregate; and performing a set of reduction operations that includes a subset of reduction operations between the first segment and the first exclusive prefix to generate a set of output data.

Advantageously, implementations of the prefix scan techniques disclosed herein exploit the efficiencies of multi-processor systems while closely approximating the theoretical minimum number of memory accesses necessary for computing a prefix scan. Another advantage is that implementations of these techniques enable processing entities to examine the states of preceding processing entities, in parallel, and use the aggregates computed by the preceding processing entities to calculate exclusive prefixes. In this fashion, a processing entity does not have to wait for a preceding processing entity to complete an inclusive prefix calculation in order to determine an exclusive prefix, in contrast to prior art approaches. Consequently, chained waiting may be avoided by the prefix scan techniques disclosed herein. As a result, among other things, available memory bandwidth may be more fully utilized, and the overall time and power consumption required to execute the prefix scan may be reduced.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5 is a conceptual diagram of a segment descriptor associated with an inclusive prefix sum, according to one embodiment of the present invention.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
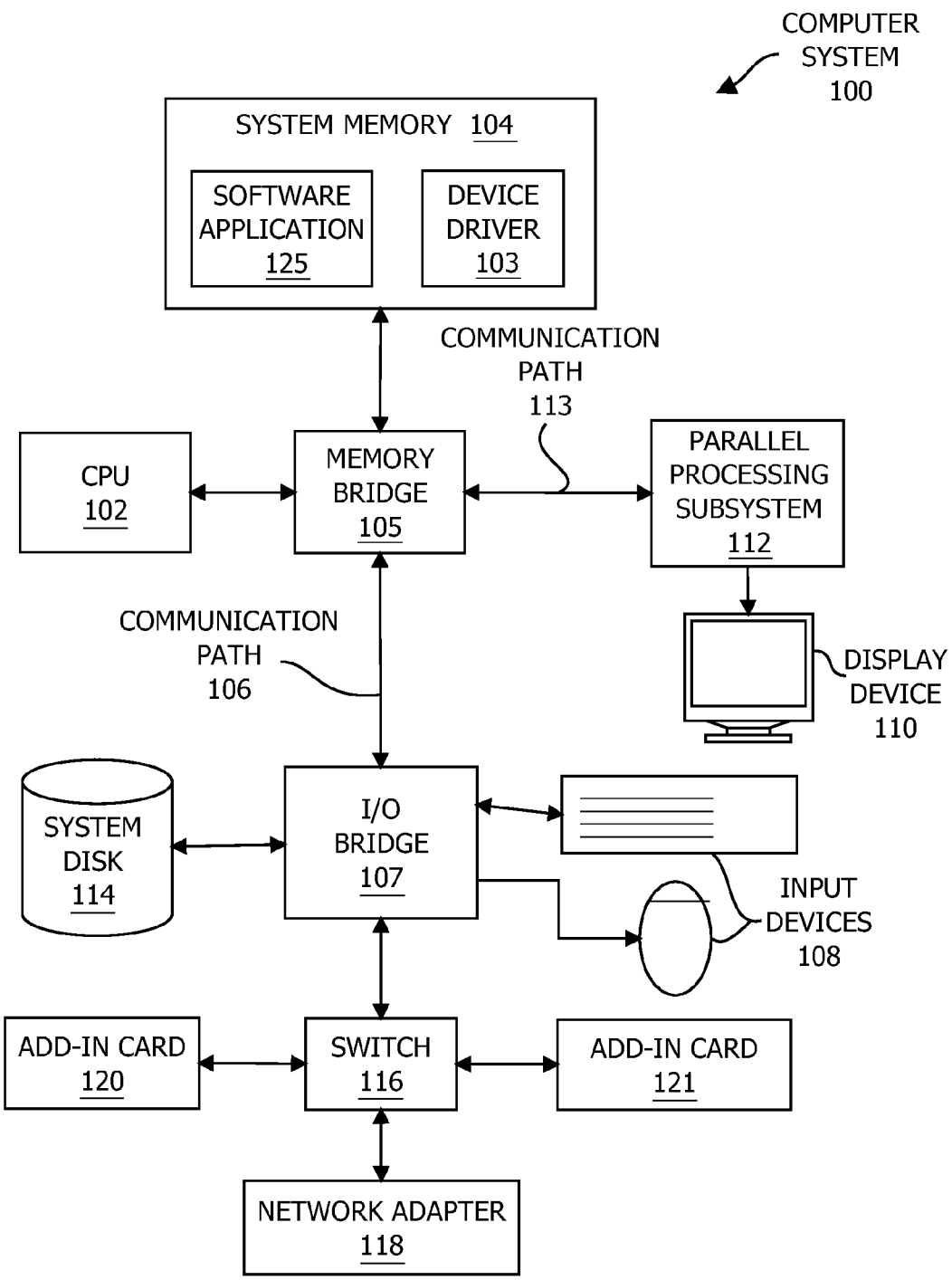
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbrige chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 may include at least one device driver 103 configured to manage the processing operations of the one or more PPUs within parallel processing subsystem 112. The system memory 104 also includes a software application 125 that executes on the CPU 102 and may issue commands that control the operation of the PPUs.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
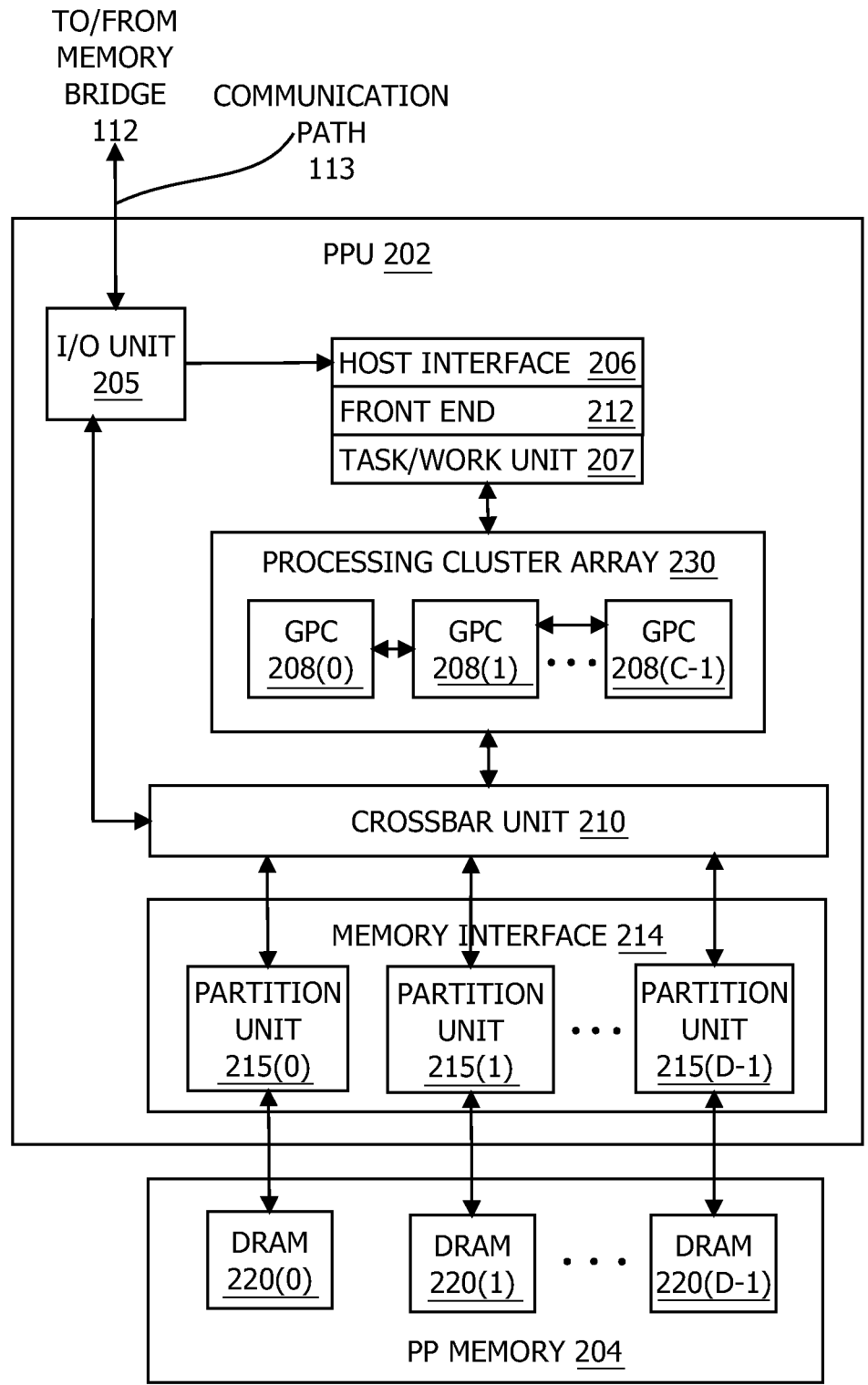
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In other embodiments, PPU 202 is capable of dispatching operations onto itself, other PPUs 202, or even CPU 102.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within a task/work unit 207. The work distribution unit receives pointers to processing tasks that are encoded as task metadata (TMD) and stored in memory. The pointers to TMDs are included in a command stream that is stored as a pushbuffer and received by a front end unit 212 from a host interface 206.

PPU 202 advantageously implements a highly parallel processing architecture based on a processing cluster array 230 that includes a set of C general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where $D \geq 1$. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3:
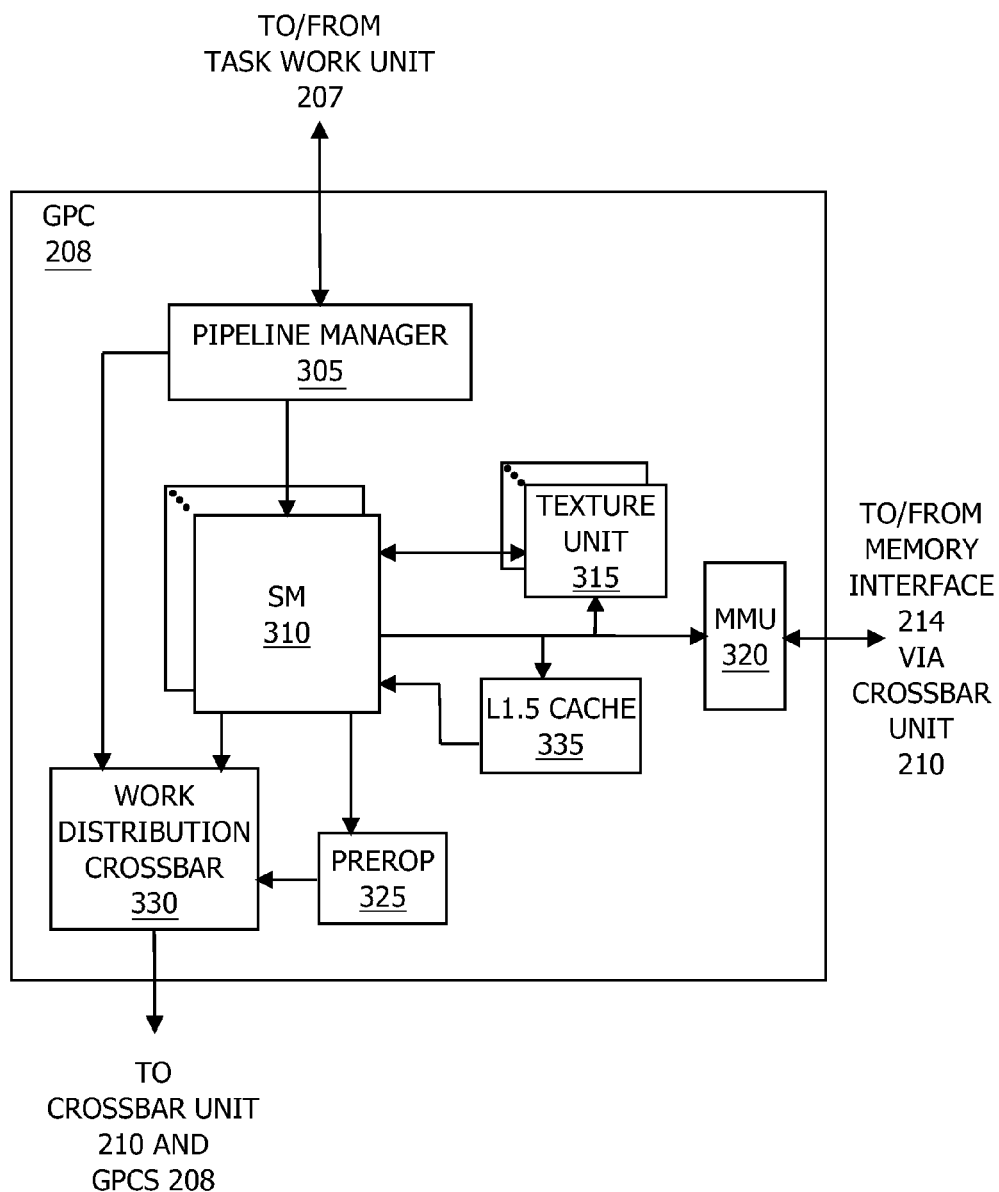
FIG. 3 is a block diagram of a general processing cluster included in the parallel processing unit of FIG. 2, according to one embodiment of the present invention.

FIG. 3 is a block diagram of a GPC 208 included in PPU 202 of FIG. 2, according to one embodiment of the present invention. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of P of SMs 310, where P≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*P thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to p*k, where k is the number of concurrently executing threads in a thread group, which is typically an integer multiple of the number of execution units within the SM 310, and p is the number of thread groups simultaneously active within the SM 310.

Although not shown in FIG. 3 each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a segment or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3A in no way limits the scope of the present invention.

The Basic Method of Parallel Prefix Scan with Dynamic Look-Back

Again, the software application 125 configures the PPU 202 to execute a large number of threads in parallel to perform graphics, general processing and/or compute operations. In particular, many software applications 125 configure the PPU 202 to implement a prefix scan computation primitive. As previously disclosed herein, given a list of inputs and a binary reduction operator, a prefix scan produces a corresponding list of outputs where each output is the reduction of the inputs occurring earlier in the input list. Advantageously, the PPU 202 is configured to implement a single-pass parallel prefix scan using multiple SMs 310 that employ an variable look-back strategy to minimize communication latencies imposed by predecessor dependencies. In particular, the SMs 310 may perform redundant work to reduce delays attributable to serial dependencies in typical prior-art single-pass implementations of prefix scan.

As persons skilled in the art will understand, embodiments of the invention include any granularity of parallel processing. For instance, some embodiments may employ only a single SM 310 to perform the prefix scan for all of the inputs included in the input list, assigning different sets of inputs to different multi-threaded execution units within the SM 310. Other embodiments may employ different SMs 310 or different threads executing on the same SM 310 or across different SMs 310 to perform the different functions described herein. Yet other embodiments may distribute those different functions across different GPUs or PPUs. These are only a few examples of possible implementations across various processing entities. As a general matter, any architecture configured to perform the operations described herein in any parallel fashion falls within the scope of the invention. Further, the reduction operator may be any associative combining operation, such as a maximum operator. And the prefix scan may be an inclusive prefix scan or an exclusive prefix scan.

Figure 4:
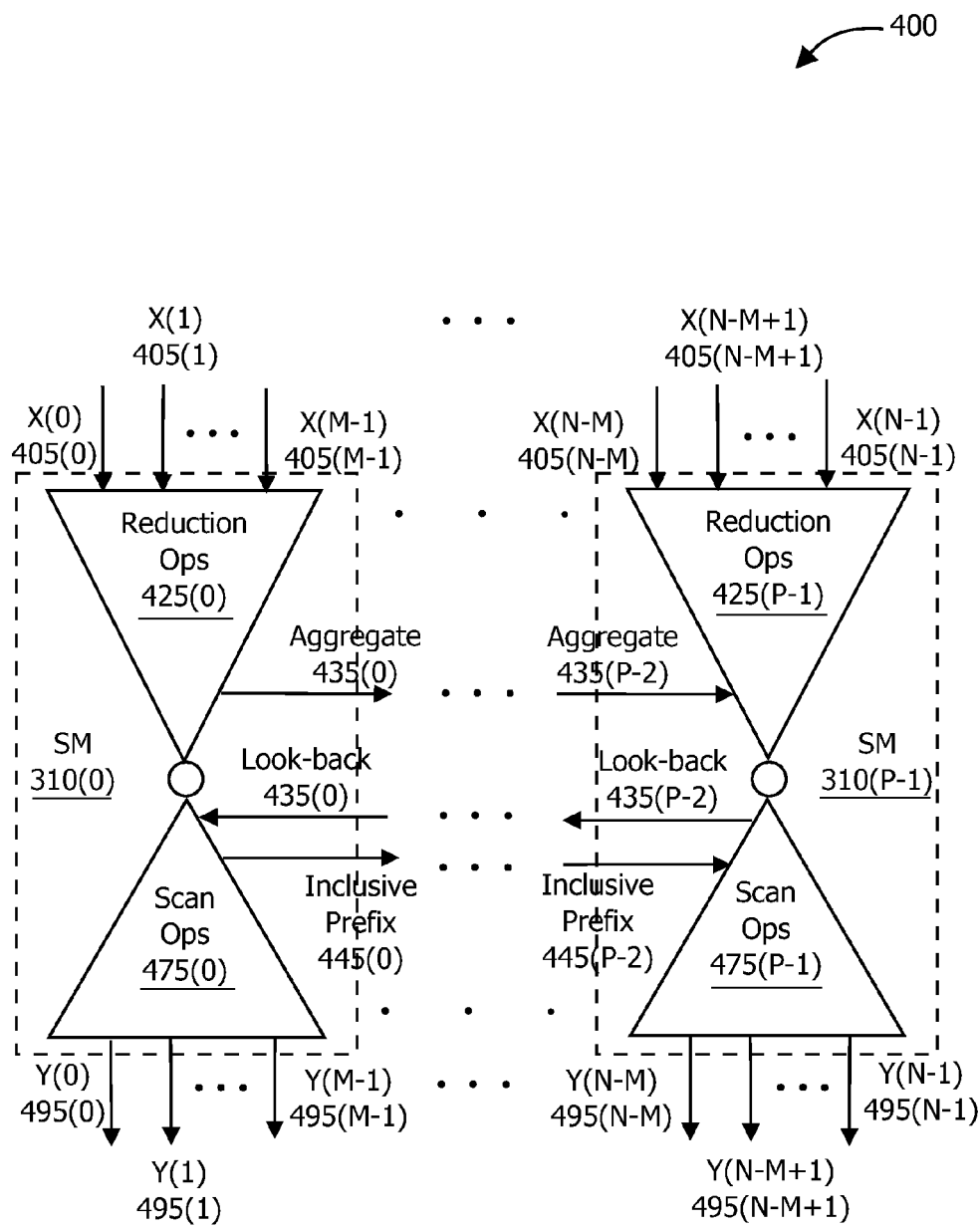
FIG. 4 is a conceptual diagram of a single-pass variable look-back prefix scan implemented by the streaming multi-processors of FIG. 3, according to one embodiment of the present invention.

FIG. 4 is a conceptual diagram of a single-pass variable look-back prefix scan implemented by the streaming multi-processors 310 of FIG. 3, according to one embodiment of the present invention. As shown, the prefix scan operates on N input Xs 405 and generates N output Ys 495, where N≥1. To exploit the parallel processing architecture of the PPU 202, the N input Xs 405 are partitioned into sequential segments of M input Xs 405. Subsequently, each segment is assigned to and processed by a streaming multiprocessor (SM) 310. In particular, the prefix scan is performed by a set of P streaming multiprocessors (SMs) 310 included in the PPU 202 of FIG. 2.

As shown, the PPU 202 performs a single input data read operation per input X 405, corresponding to the single pass through the input Xs 405. By contrast, in typical prior-art parallel implementations of prefix scan, a PPU performs multiple input data read operations per input, corresponding to multiple passes through the inputs. Consequently, the execution time, the power consumption, and the memory bandwidth use attributable to the prefix scan may be reduced compared to prior-art parallel implementations of prefix scan.

As part of the single pass, each SM 310 performs reduction operations (ops) 425 and scan operations (ops) 475. During the reduction ops 425, each SM 310 calculates a segment-wide aggregate 435 based on the input Xs 405 associated with the assigned segment. For instance, if the reduction operator is an addition operator, then the SM 310(0) calculates the aggregate 435(0) by summing the input Xs 405(0) through 405(M−1). As shown, the SMs 310(0) through 310(P−1) perform the reduction ops 425(0) through 425(P−1) substantially in parallel, thereby exploiting the parallel processing architecture of the PPU 202.

Prior to performing the scan ops 475, each of the SMs 310 determines an exclusive prefix (not shown.) The exclusive prefix for a particular segment represents the output reductions of all of the input Xs 405 preceding the input Xs 405 associated with the assigned segment. Consequently, each SM 310 is dependent upon data that is associated with the chain of segments preceding the segment assigned to the SM 310. Notably, the exclusive prefix for a particular segment is equivalent to an inclusive prefix 445 for the immediately preceding segment.

In typical prior-art techniques, each processing unit is dependent upon the inclusive prefix of the immediately preceding segment. Such a serial dependence creates a "chained-scan" effect, where each processor does not calculate the prefixes (external and internal) for the assigned segment until the processor that is assigned the immediately preceding segment has calculated the immediately preceding inclusive prefix. For instance, suppose that there were to be four prior-art processors associated with the prefix scan. In such a scenario, the fourth processor would not determine the exclusive prefix of the fourth segment until the third processor calculated the inclusive prefix of the third segment. Similarly, the third processor would not calculate the inclusive prefix of the third segment until the second processor calculated the inclusive prefix of the second segment. Finally, the second processor would not calculate the inclusive prefix of the second segment until the first processor calculated the inclusive prefix of the first segment.

To break this serial dependency chain and reduce the latency of the overall prefix scan, each of the SMs 310 is configured to perform redundant computations to determine the exclusive prefix and, subsequently, the inclusive prefix 445. In operation, each of the SMs 310 performs write operations to set segment descriptors (not shown in FIG. 4) associated with the assigned segment. Further, each of the SMs 310 (with the exception of the first SM 310(0)) performs look-backs 435 to access preceding segment descriptors set by other SMs 310 that are assigned increasingly antecedent segments. More specifically, as each SM 310 processes the assigned segment, the SM 310 performs write operations to set the segment-specific aggregate 435 included in the segment descriptor and, subsequently, to set the segment-specific inclusive prefix 445 included in the segment descriptor. Because each SM 310 is configured to access the aggregates 435 of the preceding segments as the aggregates 435 become available, each SM 310 may compute the exclusive prefix of the assigned segment based on the aggregates 435 of the preceding segments. Consequently, each SM 310 is not required to wait for a different SM 310 to calculate the inclusive prefix 445 of the immediately preceding segment. For instance, a fourth SM 310 could determine the exclusive prefix associated with the fourth segment before a third SM 310 determined the inclusive prefix 445 associated with the third segment.

In a further optimization, if the inclusive prefix 445 of a preceding segment is available when a particular SM 310 performs the look-back 435, then the SM 310 incorporates the preceding inclusive prefix 445 into the exclusive prefix and terminates the look-backs 435. For instance, suppose that the SM 310(1) were to calculate the inclusive prefix 445(1) prior to the SM 310(3) performing look-backs 435. Further, suppose that the SM 310(3) were to perform look-backs 435 before the SM 310(2) were to calculate the inclusive prefix 445(2). In such a scenario, the SM 310(3) would determine the external prefix for the assigned segment based on the aggregate 435(2) and the inclusive prefix 445(1). The SM 310(3) would not access the segment descriptor associated with the SM 310(0). Advantageously, each SM 310 may determine the exclusive prefix of the assigned segment concurrently to other SMs 310 determining exclusive prefixes of other segments.

After determining the exclusive prefix of the assigned segment, the SM 310 sets the inclusive prefix 445 of the assigned segment based on the aggregate 435 of the assigned segment and the exclusive prefix. Advantageously, this enables SMs 310 that are processing succeeding segments to opportunistically use the inclusive prefix 445 of the assigned segment. After determining and setting the inclusive prefix 445 of the assigned segment, each SM 310 performs the segment-wide scan operations 475. As part of the scan operations 475, each SM 310 uses the exclusive prefix of the assigned segment to calculate the output Ys 495 that are associated with the assigned segment. Again, each SM 310 is configured to perform the scan ops 475 substantially in parallel relative to the operations of the other SMs 310. In general, each SM 310 is configured to perform operations largely independently and concurrently with the other SMs 310. Advantageously, by removing the serial dependency chain of inclusive prefix calculations, the latencies of propagating a running aggregate between SMs 310 is dramatically reduced in comparison with typical single-pass prior-art techniques.

Incorporating Processor Virtualization

Again, the SMs 310 are configured to process the entire N input Xs 405 substantially in parallel. In alternate embodiments, the total number of input Xs 405 may exceed the number of threads that are supported by the available SMs 310. In such embodiments, a portion of the segments may be sequentially assigned to the available SMs 310. Subsequently, as a particular SM 310 completes the prefix scan of the assigned segment, the next sequentially un-assigned segment may be assigned to the particular SM 310.

Incorporating Intra-Processor Parallelism

As previously disclosed herein, there are a number of execution units within each SM 310 that may be exploited to increase the concurrency of the prefix scan. In particular, each SM 310 supports many parallel threads of execution. Consequently, each SM 310 may perform the reduction ops 425 and the scan ops 475 in a parallel manner within the SM 310. For instance, each SM 310 may divide the assigned segment into sub-segments and implement one or more of the techniques disclosed herein or a prior-art technique across the assigned segment to further optimize the prefix scan.

In alternative embodiments, the SMs 310 may perform look-backs 435 of multiple preceding segments in parallel. For instance, within a particular SM 310, multiple threads may simultaneously perform look-backs 435—each thread accessing segment descriptors associated with a different preceding segment. More specifically, t threads may perform look-backs 435 that access the data associated with the "window" of t segments that precede the assigned segment. In one embodiment, after each of the t threads accesses the aggregate 435 or the inclusive prefix 445 associated with the window of preceding segments, the exclusive prefix is updated accordingly. Subsequently, if none of the t threads encountered an inclusive prefix 445, then the t threads may perform look-backs 435 on an increasingly antecedent window of segments.

Description of Inter-Processor Cooperation Through a Shared Memory

FIG. 5 is a conceptual diagram of segment descriptors 500 associated with an inclusive prefix sum, according to one embodiment of the present invention. As is well known, an inclusive prefix sum is an inclusive prefix scan in which the binary reduction operator is an addition operation.

As shown, for each segment, the segment descriptors 500 include a segment ID 552, a status flag 554, the aggregate 435 of FIG. 4, and the inclusive prefix 445 of FIG. 4. As also shown, the segment descriptors 500 represents eight segments, where the sequential segment IDs 552 represent sequential sets of the input Xs 405. Together, the eight segments represented by the segment descriptors 500 include all of the input Xs 405 associated with the prefix scan. For each segment, the status flag 554 indicates whether the SM 310 associated with the segment has determined the aggregate 435 and/or the inclusive prefix 445 associated with the segment. Notably, the status flags 554 are used to ensure that the SMs 310 do not access invalid data.

Before the prefix scan, the status flags 554 are initialized to a value of 'X'—indicating that the aggregates 435 and the inclusive prefixes 445 are not available for read access by the SMs 310. After the segment IDs 552 are set and the status flags 554 are initialized, the SMs 310 synchronize to ensure a consistent view of the segment descriptors 500. As each SM 310 calculates the aggregate 435 and the inclusive prefix 445 of the assigned segment, the SM 310 performs write operations to update the segment descriptors 500 appropriately. Advantageously, each SM 310 is configured to perform look-backs 435 to access the aggregates 435 and the inclusive prefixes 445 of preceding segments.

To ensure the integrity of the prefix scan, each SM 310 is configured to perform a memory fence as part of updating the aggregates 435 and the inclusive prefixes 445 included in the segment descriptors 500. More specifically, to update the segment descriptors 500 to reflect a calculated aggregate 435, the appropriate SM 310 sequentially performs a write operation to the aggregate 435, a memory fence, and a write operation to set the status flag 554 to 'A.' The memory fence preserves a valid, consistent interpretation of the segment descriptors 500 across the SMs 310 by ensuring that the compiler or memory subsystem does not reorder the write operations to the aggregate 435 and the status flag 554. Notably, the status flag 554 value 'A' indicates that the aggregate 435 is valid and is available for read access by other SMs 310.

Similarly, to update the segment descriptors 500 to reflect a calculated inclusive prefix 445, the appropriate SM 310 sequentially performs a write operation to the inclusive prefix 445, a memory fence, and a write operation to set the status flag 554 to 'P.' The status flag 554 value 'P' indicates that the inclusive prefix 445 is valid and available for read access by other SMs 310.

As part of performing the look-backs 435, each of the SMs 310 accesses the status flag 554 of an antecedent segment before accessing the aggregate 435 or the inclusive prefix 445 of the antecedent segment. Notably, the SM 310 will not perform a read operation on a particular aggregate 435 unless the corresponding status flag 554 is set to 'A.' Similarly, the SM 310 will not perform a read operation on a particular inclusive prefix 445 unless the corresponding status flag 554 is set to 'P.' In this fashion, the SMs 310 coordinate across the segments to ensure the correct execution of the prefix sum.

In alternate embodiments, the each segment descriptor 500 comprises a single architectural word that stores both the status flag 554 and a value field. The value field represents either the aggregate 435 or the inclusive prefix 445, depending on the value of the status flag 554. In such embodiments, the segment descriptor 500 does not include the aggregate 435 and inclusive prefix 445 as separate fields. Because the architectural word is updated in a single write operation, a memory fence is no longer required to ensure the integrity of the segment descriptors 500.

A Specific Example of Prefix Sum

For explanatory purposes only, the FIG. 5 depicts the segment descriptors 500 associated with an exemplary inclusive prefix sum at a particular snap-shot in time. In this example, the prefix sum is executed by eight SM 310s, and the segment-wide sum of each segment is equal to 2.

As shown, the SM 310(0) has completed processing the assigned segment 0. The SM 310(0) has set the aggregate 435(0) to 2, the status flag 554(0) to 'P,' and the inclusive prefix 445(0) to 2. Although not shown, the SM 310(0) has calculated the output Ys 495 associated with segment 0.

The SM 310(1) is processing the assigned segment 1. The SM 310(1) has set the aggregate 435(1) to 2, the status flag 554(1) to 'A,' and the inclusive prefix 445(1) to 2. However, the SM 310(1) has not updated the status flag 554(1) to 'P,' therefore other SMs 310 cannot read the inclusive prefix 445(1). Notably, the SM 310(1) set the segment-specific exclusive prefix to the inclusive prefix 445(0) of segment 0.

The SM 310(2) is processing the assigned segment 2. The SM 310(2) has set the aggregate 435(2) to 2, and the status flag 554(2) to 'A.' The SM 310(2) has not performed look-backs 435.

The SM 310(3) has processed the assigned segment 3. The SM 310(3) has set the aggregate 435(3) to 2, the status flag 554(3) to 'P,' and the inclusive prefix 445(3) to 8. The SM 310(3) performed three look-backs 435 (accessing segment descriptors 500 associated with segment 2, segment 1, and segment 0) to determine the exclusive prefix of segment 3.

The SM 310(4) is processing the assigned segment 4. The SM 310(4) has set the aggregate 435(4) to 2, and the status flag 554(4) to 'A.' The SM 310(4) has not performed look-backs 435.

The SM 310(5) has processed the assigned segment 5. The SM 310(5) has set the aggregate 435(5) to 2, the status flag 554(5) to 'P,' and the inclusive prefix 445(5) to 12. The SM 310(5) performed two look-backs 435 (accessing segment descriptors 500 associated with segment 4 and segment 3) to determine the exclusive prefix of segment 5. Although not shown, the SM 310(5) has calculated the output Ys 495 associated with segment 5.

The SM 310(6) has not processed the assigned segment 6.

The SM 310(7) is processing the assigned segment 7. The SM 310(7) has set the aggregate 435(7) to 2, and the status flag 554(7) to 'A.' The SM 310(7) is waiting for SM 310(6) to determine the aggregate 435(6) and update the status flag 554(6) to 'A.'

An Operational Flow Diagram of the Method

Figure 6A:
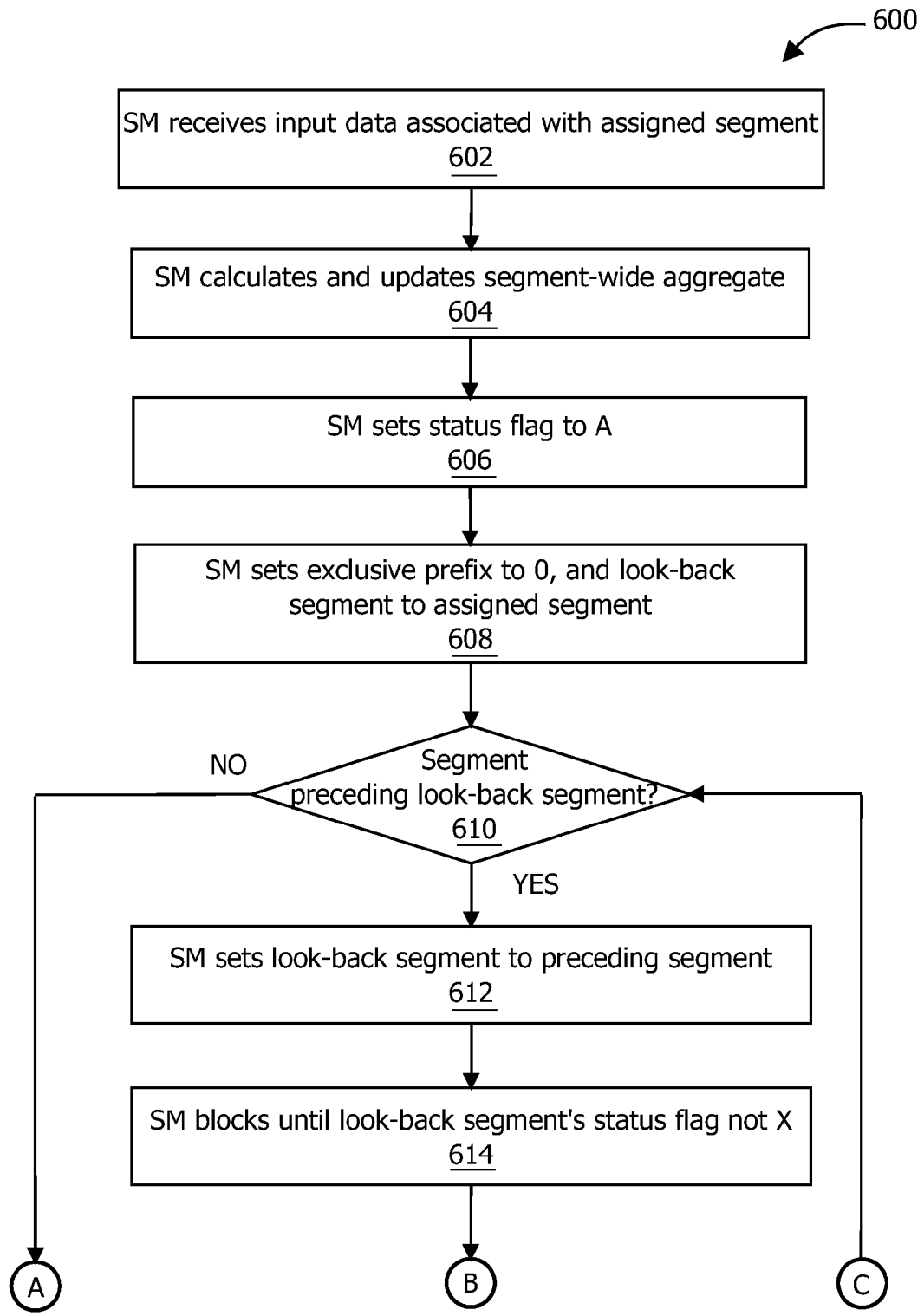
FIGS. 6A-6B set forth a flow diagram of method steps for performing an inclusive prefix sum, according to one embodiment of the present invention.
Figure 6B:
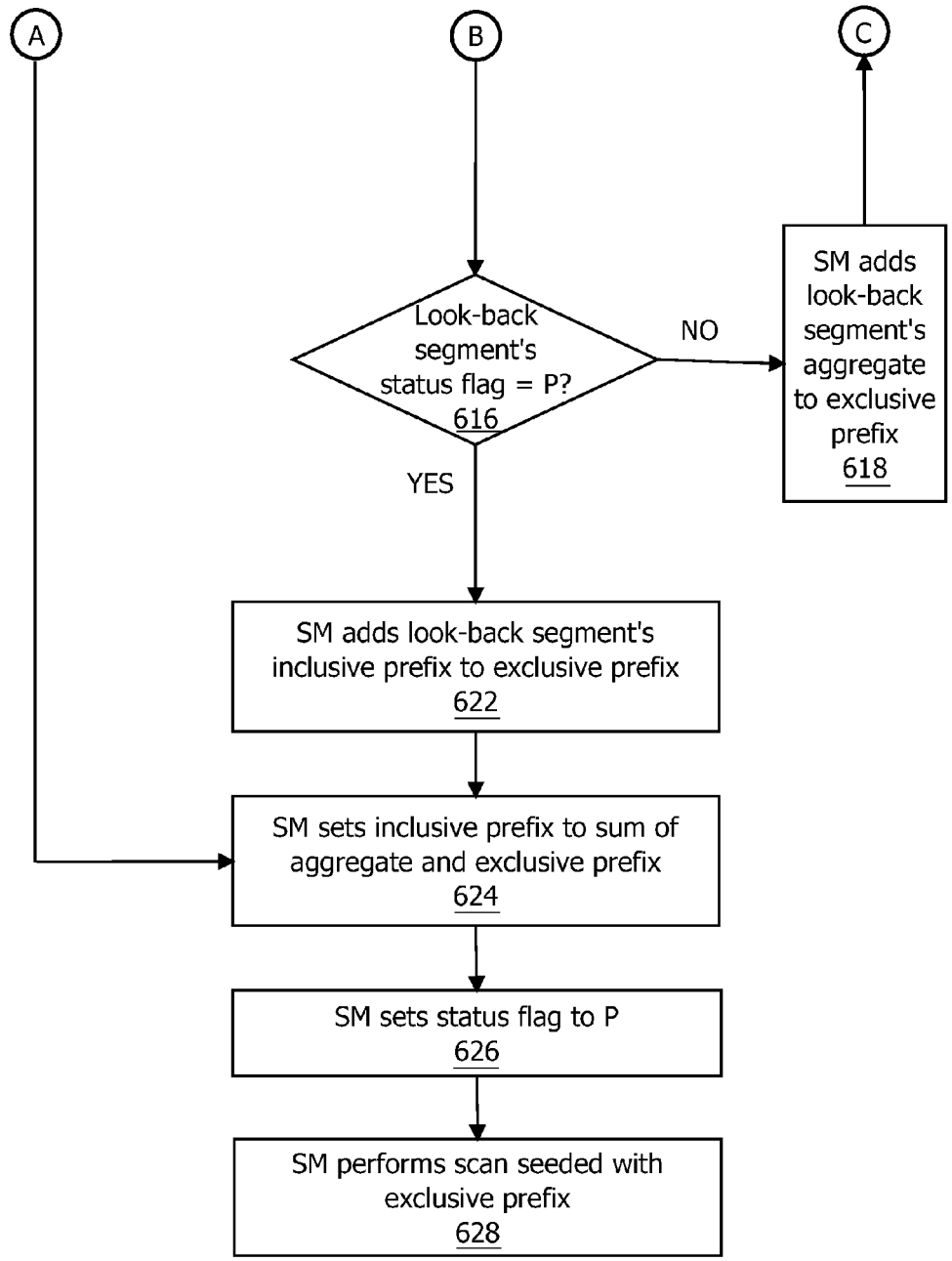

FIGS. 6A-6B set forth a flow diagram of method steps for performing an inclusive prefix sum, according to one embodiment of the present invention. Although the method steps are described with reference to the systems of FIGS. 1-5, persons skilled in the art will understand that any system configured to implement the method steps, in any order, falls within the scope of the present invention.

For explanatory purposes, the context of FIGS. 6A-6B is that the PPU 202 is executing an inclusive prefix sum on the input Xs 405. In operation, the PPU 202 partitions the inputs Xs 405 into segments of input Xs 405. Subsequently, the PPU 202 assigns these segments of inputs Xs 405 and the associated segment descriptors 500 to a plurality of SM 310s within the PPU 202. To ensure a consistent view of the segment descriptors 500 associated with the entire prefix sum, the PPU 202 initializes the segment descriptors 500 associated with each of the segments and synchronizes the SMs 310 that are assigned segments. In particular, for each segment descriptor 500, the PPU 202 sets the segment ID 552 to specify a unique segment of input Xs 405 and the status flag 554, the aggregate 435, and the inclusive prefix 445 to reflect an unprocessed state. The FIGS. 6A-6B set forth method steps for performing an inclusive prefix sum on a particular segment of input Xs 405.

As shown, a method 600 begins at step 602, where a particular SM 310 within a PPU 202 is assigned a segment of input Xs 405 and the associated segment descriptors 500 as part of a prefix sum. In alternate embodiments, the granularity of the processing unit that is assigned a segment of input Xs 405 may vary. For instance, a segment may be assigned to an execution unit within the SM 310, the SM 310, the GPC 208, the PPU 202, or a core of the CPU 102. Further, the segment descriptors 500 may be initialized and the assigned processing unit may synchronize with other processing units in any technically feasible fashion. For example, if the assigned processing unit is the SM 310, then each SM 310 may initialize the segment descriptor 500 associated with the assigned segment and synchronize with different SM 310s without the guidance of a coordinating unit.

At step 604, the SM 310 calculates the segment-wide aggregate of the assigned segment. Because the SM 310 is configured to implement a prefix sum, the SM 310 performs a sum operation on all of the input Xs 405 associated with the assigned segment. The SM 310 then updates the aggregate 435 included in the segment descriptor 500 associated with the assigned segment to reflect the calculated segment-wide aggregate. At step 606, the SM 310 sets the status flag 554 included in the segment descriptor 500 associated with the assigned segment to reflect that the aggregate 435 is valid. Notably, to ensure that different SMs 310 do not access erroneous segment descriptors 500, the SM 310 ensures that the aggregate 435 is updated before updating the status flag 554. For instance, in some embodiments the SM 310 may perform a memory fence associated with the aggregate 435 before updating the status flag 554. At step 608, the SM 310 sets a segment-specific exclusive prefix to zero and initializes a look-back segment corresponding to the assigned segment. If at step 610, the SM 310 determines that there is not a segment that precedes the look-back segment, then the method 600 proceeds to step 624, described in greater detail below.

At step 610, if the SM 310 determines that there is a segment that precedes the look-back segment, then the method 600 proceeds to step 612. At step 612, the SM 310 sets the look-back segment to the segment preceding the look-back segment. At step 614, the SM 310 performs a read operation on the segment descriptor 500 associated with the look-back segment to determine whether the status flag 554 associated with the look-back segment indicates that the look-back segment is in a processed state. As part of step 614, the SM 310 blocks further processing of the assigned segment until the status flag 554 associated with the look-back segment indicates that the look-back segment is in a processed state. At step 616, if the SM 310 determines that the status flag 554 associated with the look-back segment indicates that the aggregate 435 is available but the inclusive prefix 445 is not available, then the method 600 proceeds to step 618. At step 618, the SM 310 performs a read operation to determine the aggregate 435 associated with the look-back segment and increments the exclusive prefix by this look-back aggregate 435. The method 600 then returns to step 610, previously described herein. The SM 310 repeatedly cycles through steps 610 through 618, incrementing the exclusive prefix by the aggregate 435 associated with increasingly antecedent segments. The SM 310 discontinues cycling when the SM 310 incorporates all the antecedent aggregates 435 or the status flag 554 associated with the look-back segment indicates that the inclusive prefix 445 is available.

If, at step 616, the SM 310 determines that the status flag 554 associated with the look-back segment indicates that inclusive prefix 445 is available, then the method 600 proceeds to step 622. At step 622, the SM 310 performs a read operation to determine the inclusive prefix 445 associated with the look-back segment and then increments the exclusive prefix by this look-back inclusive prefix 445. In this fashion, if an antecedent segment calculates the associated inclusive prefix 445 prior to the look-back 435 by the segment assigned to the SM 310, then the SM 310 leverages this encounter to terminate the look-back 435 of increasingly antecedent segments.

At step 624, the SM 310 assigns the inclusive prefix 445 of the assigned segment to the sum of the aggregate and the exclusive prefix. At step 626, the SM 310 sets the status flag 554 included in the segment descriptor 500 associated with the assigned segment to reflect that the inclusive prefix 445 is valid. Again, to ensure that different SMs 310 do not access erroneous segment descriptors 500, the SM 310 ensures that the inclusive prefix 445 is updated before updating the status flag 554. At step 628, the SM 310 performs scan operations seeded with the exclusive prefix across the assigned segment. As part of step 624, the SM 310 generates the output Ys 495 associated with the assigned segment of input Xs 405.

As previously described herein, the SM 310s may operate substantially in parallel, thereby exploiting the advantages of parallel processing architecture of the PPU 202. Further, in some embodiments, the number of segments may exceed the number of processors dedicated to performing the prefix sum operation. In such architectures, the segments may be distributed sequentially to the available processing units. When a processing unit completes the processing of an assigned segment, the processing unit may be assigned the next sequential un-assigned segment. In some embodiments, as persons skilled in the art will understand, method 600 may be modified to support associative combining operators others than the addition operator. For instance, in some embodiments, method 600 may be modified to support a maximum operator.

In sum, a PPU is configured to perform a single-pass parallel prefix scan using variable look-back. The PPU partitions the input list into multiple segments and each segment is assigned to an SM within the PPU. Notable, each SM is configured to perform write operations on the segment descriptor associated with the assigned segment as well as read operations on segment descriptors associated with preceding segments. In operation, each SM computes a segment-wide aggregate based on the inputs associated with the assigned segment, writes the segment-wide aggregate to the segment descriptor associated with the assigned segment, and sets a status flag to indicate that the segment-wide aggregate is valid. Subsequently, the SM performs look-back operations on the chain of preceding segments to determine the appropriate exclusive prefix. Each segment in the chain of preceding segments is associated with inputs that are increasingly further away from the inputs associated with the SM. As the preceding segment-wide aggregates become valid, the SM incorporates the preceding segment-wide aggregates into the exclusive prefix.

While performing the loop-back operations, if the SM encounters a valid inclusive prefix, then the SM incorporates the inclusive prefix instead of the preceding segment-wide aggregate into the exclusive prefix. The SM then terminates the look-back process. Alternatively, if the SM encounters the first segment, then the SM terminates the look-back process. After completing the look-back process, the SM computes an inclusive prefix based on the exclusive prefix and the segment-wide aggregate, writes the inclusive prefix to the segment descriptor associated with the assigned segment, and sets the status flag to indicate that the inclusive prefix is valid. Finally, the SM completes the scan of the assigned segment, incorporating the exclusive prefix to generate the outputs for the assigned segment.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A computer-implemented method for performing a prefix scan, the method comprising:
   subdividing a list of input data into a plurality of segments, wherein a second segment precedes a first segment, and a third segment precedes the second segment;
   calculating, by a first processing entity, a first aggregate that represents an accumulation of one or more reduction operations performed on the first segment;
   calculating, by a second processing entity, a second aggregate that represents an accumulation of one or more reduction operations performed on the second segment;
   calculating, by a third processing entity, a third aggregate that represents an accumulation of one or more reduction operations performed on the third segment;
   calculating, by the first processing entity, a first exclusive prefix based on the second aggregate and the third aggregate, prior to the second processing entity calculating a first inclusive prefix for the second segment;
   calculating, by the first processing entity, a second inclusive prefix based on the first exclusive prefix and the first aggregate; and
   performing a set of reduction operations that includes a subset of reduction operations between the first segment and the first exclusive prefix to generate a set of output data.

2. The method of claim 1, further comprising calculating a second exclusive prefix based on the third aggregate, wherein calculating the first exclusive prefix and calculating the second exclusive prefix are performed substantially in parallel.

3. The method of claim 2, wherein the set of reduction operations further includes a subset of reduction operations between the second segment and the second exclusive prefix, and wherein the subset of reduction operations between the first segment and the first exclusive prefix and the subset of reduction operations between the second segment and the second exclusive prefix are performed substantially in parallel.

4. The method of claim 1, wherein calculating the first aggregate is performed substantially in parallel with at least one of calculating the second aggregate and calculating the third aggregate.

5. The method of claim 1, further comprising updating a second segment descriptor to include the second aggregate and then indicating that the second aggregate is valid.

6. The method of claim 5, wherein updating the second segment descriptor to include the second aggregate and then indicating that the second aggregate is valid comprises performing a write operation to a first machine word that includes both the second aggregate and one or more bits that specify that the second aggregate is valid.

7. The method of claim 6, wherein the first machine word comprises an 8-bit, 16-bit, 32-bit, or 64-bit unsigned integer.

8. The method of claim 5, further comprising determining that the second segment descriptor does not include an inclusive prefix that is valid.

9. The method of claim 1, further comprising determining that a third segment descriptor includes an inclusive prefix that is valid, and setting a second exclusive prefix equal to the inclusive prefix.

10. The method of claim 1, wherein the one or more reduction operations performed in calculating the first aggregate, the second aggregate, and the third aggregate comprise one or more prefix sum operations.

11. The method of claim 1, wherein the first exclusive prefix is further based on a plurality of aggregates, and each aggregate included in the plurality of aggregates represents an accumulation of one or more reduction operations performed on a different segment in the plurality of segments that precedes the first segment.

12. The method of claim 1, wherein the first exclusive prefix is further based on:
   a second exclusive scan associated with a fourth segment included in the plurality of segments that precedes the first segment, and
   a plurality of aggregates, including the second aggregate and the third aggregate, that represents an accumulation of one or more reduction operations performed on each segment included in the plurality of segments that follow the fourth segment and precede the first segment.

13. The method of claim 1, wherein each of the first processing entity, the second processing entity, and the third processing entity comprises a streaming multiprocessor.

14. The method of claim 1, wherein each of the first processing entity, the second processing entity, and the third processing entity comprises an execution unit within a streaming multiprocessor, a general processing cluster, a parallel processing unit, or a core of a central processing unit.

15. The method of claim 1, wherein the second processing entity calculates the second aggregate and the first inclusive prefix via a single read operation of each item of input data included in the second segment.

16. A non-transitory computer-readable medium that includes instructions that, when executed by a processing entity, cause the processing entity to perform a prefix scan, by performing the steps of:
   subdividing a list of input data into a plurality of segments, wherein a second segment precedes a first segment, and a third segment precedes the second segment;
   calculating, by a first processing entity, a first aggregate that represents an accumulation of one or more reduction operations performed on the first segment;
   calculating, by a second processing entity, a second aggregate that represents an accumulation of one or more reduction operations performed on the second segment;
   calculating, by a third processing entity, a third aggregate that represents an accumulation of one or more reduction operations performed on the third segment;
   calculating, by the first processing entity, a first exclusive prefix based on the second aggregate and the third aggregate, prior to the second processing entity calculating a first inclusive prefix for the second segment;
   calculating, by the first processing entity, a second inclusive prefix based on the first exclusive prefix and the first aggregate; and
   performing a set of reduction operations that includes a subset of reduction operations between the first segment and the first exclusive prefix to generate a set of output data.

17. The computer-readable medium of claim 16, further comprising calculating a second exclusive prefix based on the third aggregate, wherein calculating the first exclusive prefix and calculating the second exclusive prefix are performed substantially in parallel.

18. The computer-readable medium of claim 17, wherein the set of reduction operations further includes a subset of reduction operations between the second segment and the second exclusive prefix, and wherein the subset of reduction operations between the first segment and the first exclusive prefix and the subset of reduction operations between the second segment and the second exclusive prefix are performed substantially in parallel.

19. The computer-readable medium of claim 16, wherein calculating the first aggregate is performed substantially in parallel with at least one of calculating the second aggregate and calculating the third aggregate.

20. The computer-readable medium of claim 16, further comprising updating a second segment descriptor to include the second aggregate and then indicating that the second aggregate is valid.

21. The computer-readable medium of claim 20, wherein updating the second segment descriptor to include the second aggregate and then indicating that the second aggregate is valid comprises performing a write operation to a first machine word that includes both the second aggregate and one or more bits that specify that the second aggregate is valid.

22. The computer-readable medium of claim 21, wherein the first machine word comprises an 8-bit, 16-bit, 32-bit, or 64-bit unsigned integer.

23. The computer-readable medium of claim 20, further comprising determining that the second segment descriptor does not include an inclusive prefix that is valid.

24. The computer-readable medium of claim 16, further comprising determining that a third segment descriptor includes an inclusive prefix that is valid, and setting a second exclusive prefix equal to the inclusive prefix.

25. The computer-readable medium of claim 16, wherein the one or more reduction operations performed in calculating the first aggregate, the second aggregate, and the third aggregate comprise one or more prefix sum operations.

26. A computing device, comprising:
a memory; and
a processing subsystem coupled to the memory and including:
 a first processing entity configured to calculate a first aggregate that represents an accumulation of one or more reduction operations performed on a first segment included in a plurality of segments,
 wherein the plurality of segments comprises a second segment that precedes the first segment, and a third segment that precedes the second segment;
 a second processing entity configured to calculate a second aggregate that represents an accumulation of one or more reduction operations performed on the second segment; and
 a third processing entity configured to calculate a third aggregate that represents an accumulation of one or more reduction operations performed on the third segment;
wherein the first processing entity is further configured to:
 calculate a first exclusive prefix based on the second aggregate and the third aggregate, prior to the second processing entity calculating a first inclusive prefix for the second segment, and
 calculate a second inclusive prefix based on the first exclusive prefix and the first aggregate, and
 perform a subset of reduction operations between the first segment and the first exclusive prefix to generate a portion of a set of output data.

\* \* \* \* \*